(12) United States Patent
Ishida

(10) Patent No.: US 12,313,572 B2
(45) Date of Patent: May 27, 2025

(54) X-RAY INSPECTION APPARATUS AND X-RAY INSPECTION METHOD

(71) Applicant: ANRITSU CORPORATION, Atsugi (JP)

(72) Inventor: Masaru Ishida, Atsugi (JP)

(73) Assignee: ANRITSU CORPORATION, Atsugi (JP)

( * ) Notice: Subject to any disclaimer, the term of this patent is extended or adjusted under 35 U.S.C. 154(b) by 176 days.

(21) Appl. No.: 18/245,200

(22) PCT Filed: Sep. 13, 2021

(86) PCT No.: PCT/JP2021/033560
§ 371 (c)(1),
(2) Date: Mar. 14, 2023

(87) PCT Pub. No.: WO2022/065110
PCT Pub. Date: Mar. 31, 2022

(65) Prior Publication Data
US 2023/0366838 A1    Nov. 16, 2023

(30) Foreign Application Priority Data

Sep. 23, 2020   (JP) ................................. 2020-158379

(51) Int. Cl.
*G01N 23/18*        (2018.01)
(52) U.S. Cl.
CPC ....... *G01N 23/18* (2013.01); *G01N 2223/302* (2013.01); *G01N 2223/305* (2013.01); *G01N 2223/401* (2013.01); *G01N 2223/646* (2013.01)
(58) Field of Classification Search
CPC ..... G01N 2223/1016; G01N 2223/302; G01N 2223/305; G01N 2223/646;
(Continued)

(56) References Cited

U.S. PATENT DOCUMENTS

2009/0238432 A1*   9/2009   Can ......................... G06T 7/001
                                                                    382/132
2010/0220910 A1*   9/2010   Kaucic .................... G06T 7/001
                                                                    382/154
(Continued)

FOREIGN PATENT DOCUMENTS

JP        2002168802 A        6/2002
JP        2002189002 A        7/2002
(Continued)

OTHER PUBLICATIONS

Translation of WO-2019030449 (Year: 2019).*
(Continued)

*Primary Examiner* — David J Makiya
*Assistant Examiner* — Soorena Kefayati
(74) *Attorney, Agent, or Firm* — Greer Burns & Crain Ltd.

(57) ABSTRACT

An X-ray inspection apparatus includes an X-ray generator; an X-ray detector; and a determination unit determining a quality state of an inspection object, based on an X-ray detection signal. The apparatus has an X-ray image storing unit storing a first inspection image, corresponding to the X-ray detection signal outputted from the X-ray detector, whose observation direction is the direction in which the X-rays transmits the inspection object; a pseudo three-dimensional information generation model generating pseudo three-dimensional information regarding a type of object to be learned; and an inspection image generation unit creating a second inspection image regarding the type of object to be learned having an observation direction different from the first inspection image, based on the first inspection image regarding the type of object to be learned. The determination unit performs the determination based on at (Continued)

least the second inspection image created by the inspection image generation unit.

10 Claims, 6 Drawing Sheets

(58) Field of Classification Search
CPC ..... G01N 2223/401; G01N 2223/3308; G01N 23/018; G06T 7/0004; G06T 7/001
See application file for complete search history.

(56) References Cited

U.S. PATENT DOCUMENTS

| | | | |
|---|---|---|---|
| 2017/0219495 A1* | 8/2017 | Nagata | G01N 21/95684 |
| 2018/0101944 A1* | 4/2018 | Sakai | H01L 22/12 |
| 2020/0090314 A1* | 3/2020 | Mayr | G06F 18/40 |

FOREIGN PATENT DOCUMENTS

| | | | | |
|---|---|---|---|---|
| JP | 2009192519 A | 8/2009 | | |
| JP | 2019023664 A | 2/2019 | | |
| WO | WO-2019030449 A1 * | 2/2019 | ............. | G06T 7/001 |
| WO | WO-2020002704 A1 * | 1/2020 | ............. | G01N 23/04 |

OTHER PUBLICATIONS

Philipp Henzler et al:"Single-image Tomography:3D Volumes from 2D Cranial X- Rays"; Computer Graphics Forum: Journal Of The European Association For Computer Graphics, Wiley-Blackwell, Oxford, vol. 37, No. 2; pp. 377-388; May 22, 2018.

Hrdy J. et al: "Obtaining pseudo-3D information from single-plane X-ray imaging"; Nuclear Instruments & Methods In Physics Research, Section A, vol. 690, pp. 7-9; Jul. 7, 2012.

ISR issued in PCT/JP2021/033560, dated Nov. 8, 2021.

* cited by examiner

X-RAY INSPECTION APPARATUS AND X-RAY INSPECTION METHOD

FIELD OF THE INVENTION

The present invention relates to an X-ray inspection apparatus and an X-ray inspection method, and particularly to an X-ray inspection apparatus and an X-ray inspection method suitable for foreign matter detection, missing part detection, inspection of the shape and arrangement of the contents of the inspection object, particularly using a plurality of inspection images.

PRIOR ART

There has been conventionally known an X-ray inspection apparatus to inspect a quality state required for an inspection object, particularly an X-ray inspection apparatus to detect cumulative transmission amount of X-ray by X-ray detector for each transmission area for each predetermined period of irradiation on the inspection object during transportation, and create X-ray images.

Further, as an inspection method in the X-ray inspection apparatus, there is known an X-ray inspection method by the X-ray inspection apparatus to obtain data of a plurality of differing X-ray images and to generate images useful for foreign matter detection processing based on those data of X-ray images, so as to increase accuracy of inspection of foreign matter detection or the like.

As a conventional X-ray inspection apparatus or X-ray inspection method of this kind, there is, for example, an X-ray inspection apparatus or an X-ray inspection method to obtain a plurality of observation images with the weighting of the foreign matter and the inspection object changed, by deeming the X-ray image of the inspection object as an observation image respectively weighted and synthesized with the image of the foreign matter and the image of the inspection object not including the foreign matter, and obtaining a plurality of X-ray transmission images having differing energy bands for each inspection object, so that the image identification and detection processing of the foreign matter are performed based on separated images by independent component analysis (See Patent Document 1).

Further, there is also an X-ray inspection apparatus or X-ray inspection method capable of detecting the foreign matter with required accuracy, in spite of the shape and placement of the foreign matter, by irradiating fan beam-shaped X rays to the inspection object, in a plurality of directions deviated from the transport surface, which are differing from each other, thereby making the foreign matter identifiable by X-rays from each direction or an X-ray from any direction (See Patent Document 2).

CITATION LIST

Patent Literature

[Patent Document 1] Japanese Patent Application Publication 2009-192519
[Patent Document 2] Japanese Patent Application Publication 2002-168802

SUMMARY OF THE INVENTION

Technical Problem

However, in the former X-ray inspection apparatus and X-ray inspection method described above, although foreign matter images can be separated by independent component analysis, the inspection object being transported is imaged in a preset direction. Since the inspection method was based on the X-ray image and the imaging direction was the observation direction (line-of-sight direction), if an unexpected posture change or shape change occurs for some reason, for example, a change in the transport state such as overlap. In the case where the product is bent, damaged, broken, and the like, it is not easy to separate foreign matter components and grasp the characteristics of the shape because the observation direction is not suitable, and there is a concern that erroneous detection may occur.

Further, in the latter conventional X-ray inspection apparatus and X-ray inspection method, since the X-ray fan beams from a plurality of directions are crossed within the inspection area of the inspection object, a plurality of X-ray sources and a plurality of X-ray detectors are required, which causes a problem that the X-ray inspection apparatus becomes large and costly.

The present invention has been made to solve these conventional problems, and it is the object of the present invention to provide an X-ray inspection apparatus and an X-ray inspection method capable of always accurately observing the inspection object by the X-ray image from a preferable observing direction, in spite of the shape and the change of the posture during transportation, while simply placing the X-ray source and X-ray detector, thereby making it possible to prevent false detection at a low cost and aim for miniaturization.

Means to Solve the Problem (1) The X-ray inspection apparatus according to the present invention, for the purpose of achieving the above object, comprises: an X-ray generator that generates an X-ray that transmits an inspection object to be transported; an X-ray detector that detects the X-ray that transmitted the inspection object, and outputs an X-ray detection signal; and a determination unit that determines a quality state of the inspection object, by an inspection image generated based on the X-ray detection signal, wherein the X-ray inspection apparatus is provided with: an X-ray image storage unit that stores a first inspection image, corresponding to the X-ray detection signal outputted from the X-ray detector, whose observation direction is the direction in which the X-rays transmits the inspection object; a pseudo three-dimensional information generation model that generates a pseudo three-dimensional information regarding a type of the inspection object; and an inspection image generation unit that creates a second inspection image regarding the inspection object having the observation direction different from the first inspection image, based on the first inspection image and the pseudo three-dimensional information, the determination unit performs the determination, based on at least the second inspection image created by the inspection image generation unit.

By this configuration, in the X-ray inspection apparatus of the present invention, when the original image stored in the X-ray image storage unit as the first inspection image corresponding to the X-ray detection signal from the X-ray detector is the type of object to be learned, the second inspection image having a different observation direction from the inspection image is created by the inspection image generation unit, based on the first inspection image related to the type of object to be learned, and the determination by the determination unit is executed based on at least the second inspection image out of the first inspection image and the second inspection image having different observation directions.

Therefore, even though the X-ray inspection apparatus has high detection accuracy and has a plurality of observation directions, a mechanism for changing and holding the arrangement of the X-ray source and the X-ray detector according to the observation direction becomes unnecessary, and the configuration can be simple. As a result, regardless of changes in the posture or shape of the inspection object during transportation, the inspection target can be accurately observed with an X-ray image from a suitable observation line-of-sight direction, thereby making it easy to prevent false detection at low cost and aim miniaturization.

(2) In a preferred embodiment of the present invention, the X-ray inspection apparatus may further have a designating unit that designates the observation direction, when the second inspection image is created by the pseudo three-dimensional information.

In this case, for example, the type of object to be learned is empirically predicted or preferable observation direction that is naturally predicted from the transport conditions can be specified or adjusted in advance by the designating unit, so that the processing time can be shortened and observed direction can be optimized.

(3) In a preferred embodiment of the present invention, the determination unit may have an image processing unit that performs a predetermined feature extraction process based on the first inspection image and the second inspection image.

The predetermined feature extraction process is, for example, a process of performing differential processing on X-ray image data to emphasize edges with steep changes in image density according to the amount of X-ray transmission, contours of the shape to be detected, and the like, so that it is possible to capture the characteristics of local shading that appears in an X-ray transmission image.

(4) In a preferred embodiment of the present invention, the pseudo three-dimensional information generation model has learned the shade pattern corresponding to the three-dimensional shape of the type of the inspection object, from X-ray images in a plurality of observation directions regarding the type of the inspection object.

The plurality of observation directions referred to here may include the observation direction of the first inspection image relating to the type of the inspection object and another plurality of observation directions in which the line-of-sight position is moved back and forth and left and right with respect to the same observation direction, for example, to include a plurality of different observation directions that are substantially orthogonal to the observation direction of the first inspection image.

(5) In a preferred embodiment of the present invention, the designating unit may be configured to be capable of designating a plurality of the observation directions when creating the second inspection image.

(6) An X-ray inspection method according to the present invention is, in order to achieve the above object, an X-ray inspection method comprising: an X-ray generation step that generates an X-ray that transmits an inspection object to be transported; an X-ray detection step that detects the X-ray that transmitted the inspection object and outputs an X-ray detection signal; and a determination step that determines a quality state of the inspection object, by an inspection image generated based on the X-ray detection signal, wherein the X-ray inspection method further includes: an X-ray image storage step that stores a first inspection image corresponding to the X-ray detection signal outputted in the X-ray detection step and having a direction that the X-ray transmits the inspection object as an observation direction; an inspection image generation step that creates a second inspection image regarding the inspection object having the observation direction different from the first inspection image based on a pseudo three-dimensional information generation model that generates a pseudo three-dimensional information about the type of the inspection object and the first inspection image, and the determination step performs the determination, based on at least the second inspection image created by the inspection image generation step.

By this configuration, in the X-ray inspection method of the present invention, when the original image stored as the first inspection image corresponding to the X-ray detection signal is an image of the product type of the inspection object, a second inspection image having a different observation direction from the inspection image is created based on the first inspection image for the product type, and a determination about the quality state of the inspection object is performed, based on at least the second inspection image out of the first inspection image and the second inspection image having different observation directions.

By doing so, the observation direction of the first inspection image, that is, the X-ray image whose observation direction is an arbitrary direction that is not constrained by the direction of irradiating the X-ray to the inspection object can be used as the second inspection image, so that, for example, even if an observation direction that is constrained by an overlapping state in which the transportation form forms an unexpected shape, or a placement state that is prioritized to stabilize the transport of an inspection object that is prone to fall, causes a blind spot in the X-ray image, and the like, an inspection that can accurately detect foreign matter and a specific shape is possible.

Effect of the Invention

According to the present invention, it is possible to provide an X-ray inspection apparatus and an X-ray inspection method capable of always accurately observing the inspection object by the X-ray image from a preferable observing direction, in spite of the shape and the change of the posture during transportation, while simply placing the X-ray source and X-ray detector, thereby making it possible to prevent false detection at a low cost and aim for miniaturization.

DETAILED DESCRIPTION OF EMBODIMENTS

Hereinafter, the embodiment of the present invention will be described with reference to the drawings.

First Embodiment

Figure 1:
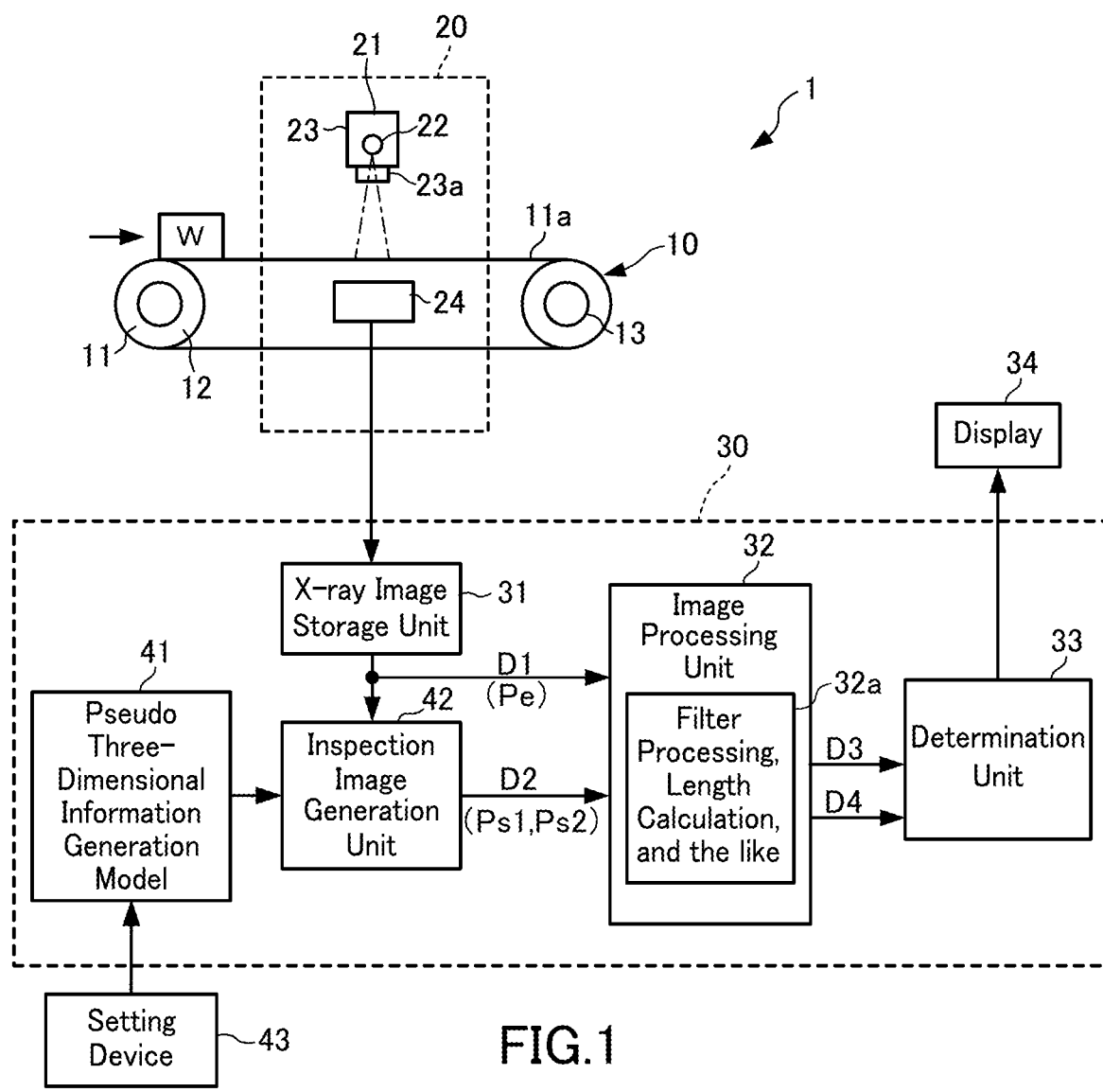
FIG. 1 is a schematic configuration diagram of an X-ray inspection apparatus according to a first embodiment of the present invention.
Figure 2:
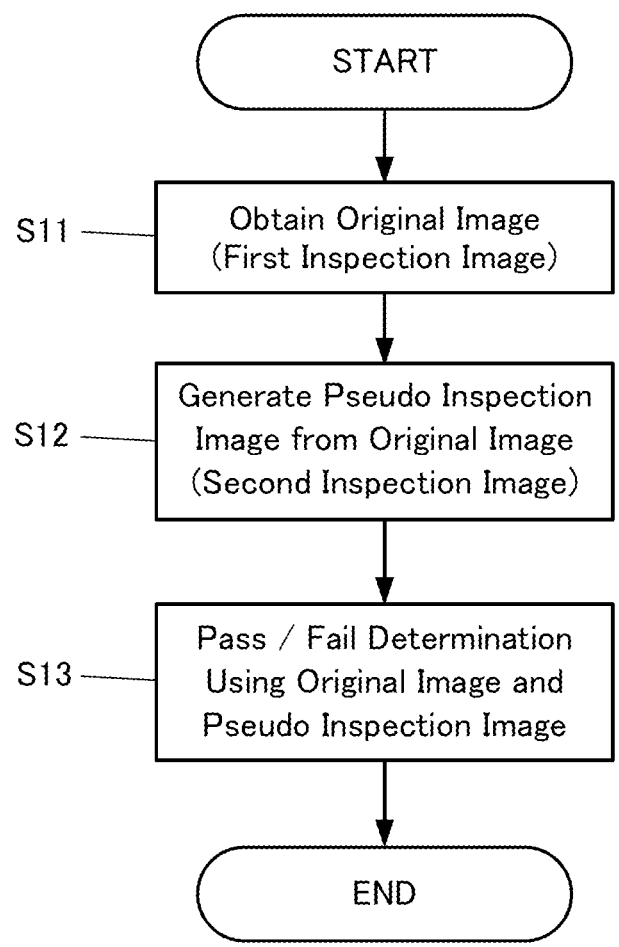
FIG. 2 is a flowchart showing a schematic processing procedure of an X-ray inspection method performed by the X-ray inspection apparatus according to the first embodiment of the present invention.
Figure 3:
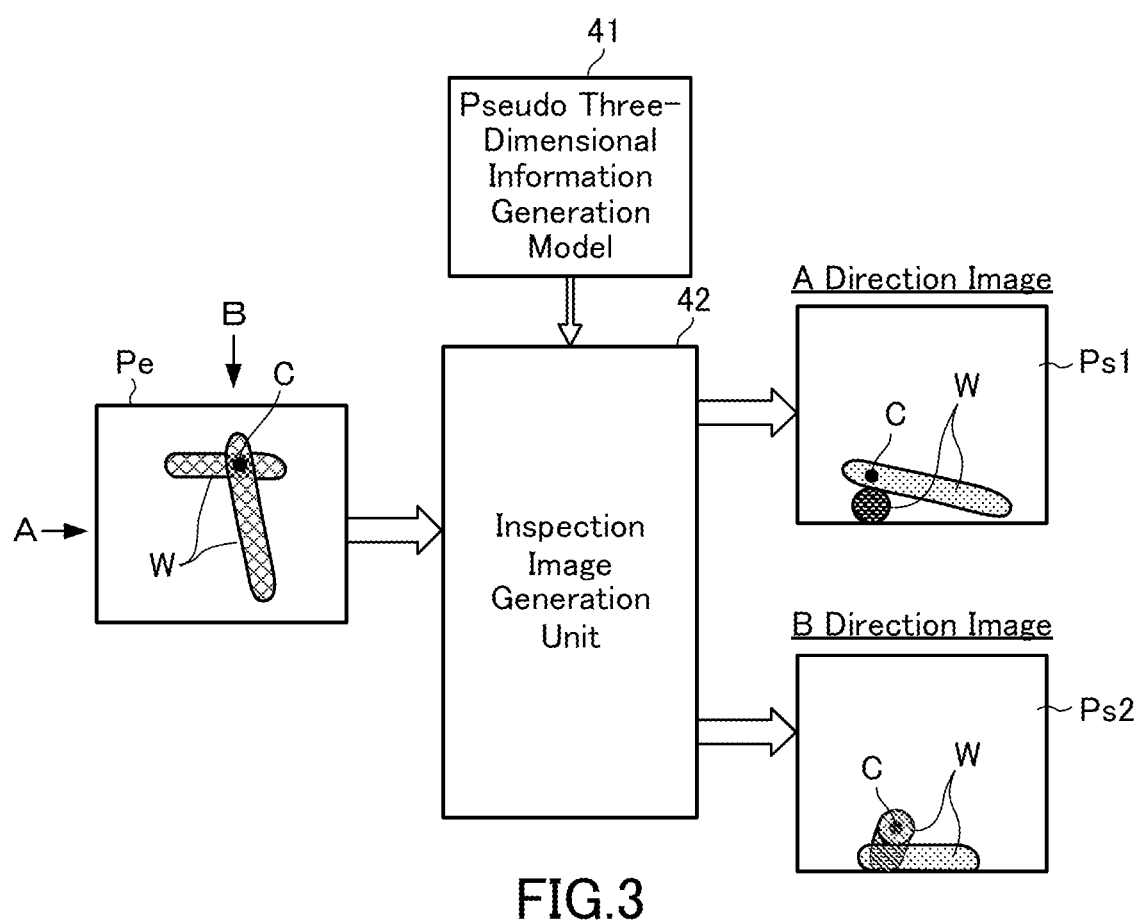
FIG. 3 is an explanatory diagram of a stage in which a plurality of pseudo inspection images having different observation directions are generated from an original image by the X-ray inspection method in the X-ray inspection apparatus according to the first embodiment of the present invention.

FIGS. 1-3 show the first embodiment for implementing the present invention as an X-ray inspection apparatus and an X-ray inspection method capable of detecting a foreign matter contained in an inspection object (article).

First, the configuration of an X-ray inspection apparatus of the present embodiment will be described.

As shown in FIG. 1 and FIG. 2, the X-ray inspection apparatus 1 is provided with a transportation unit 10, an X-ray inspection unit 20, and a control unit 30 thereof, wherein an X-ray is irradiated in the X-ray inspection unit 20 with respect to an inspection object W conveyed on a conveyer by the transportation unit 10, and a quality state of the inspection object W is inspected, for example, containing of a foreign matter C (See FIG. 3) in the inspection object W such as a packaged food or the like is detected. It should be noted that the quality state mentioned here refers to appropriateness of quality and physical quantity required for the inspection object W, for example, presence/absence of contained foreign matter, presence/absence of missing parts, pass/fail of shape/size/storage state of contents, distribution of density/thickness/volume or mass, and the like.

The transportation unit 10 is a conveyor capable of winding a loop-shaped transportation belt 11 around a plurality of transportation rollers 12, 13 and sequentially transporting the inspection object W to the right in FIG. 1, by a forward running section 11a of the transportation belt 11, and the transportation unit 10 is supported by a housing not shown.

The X-ray inspection unit 20 has an X-ray generator 21 (X-ray source) that generates an X-ray of a predetermined energy band transmitting the inspection object W, which is transported by the transportation unit 10, and the X-ray generator 21 is capable of generating the X-ray, by a known X-ray tube 22, with wavelength and intensity according to a tube current and a tube voltage of the known X-ray tube 22, and capable of irradiating a fan beam-shaped X-ray heading toward a main observing direction orthogonal to an article transporting direction of the transportation unit 10, with respect to the inspection object W in a predetermined inspection section on the transportation belt 11, through an X-ray window portion 23a of an enclosure 23.

The X-ray inspection unit 20 further has an X-ray detector 24 arranged directly under the forward running section 11a of the transportation belt 11.

Although the details are not shown, the X-ray detector 24 is constituted, for example, by an X-ray line sensor camera in which detection elements composed of a scintillator, which is a phosphor, and a photodiode or a charge-coupled device are arranged in an array at a predetermined pitch in the width direction of the transport path of the transportation unit 10, arranged to detect X-rays at a predetermined resolution. The X-ray detector 24 is disposed at a predetermined position in the transportation direction corresponding to the X-ray irradiation position from the X-ray generator 21.

This means that the X-ray detector 24 is capable of detecting X-rays irradiated from the X-ray generator 21 and transmitted through the inspection object W for each predetermined transmission region corresponding to the detection element, converting the X-ray into an electric signal corresponding to the amount of the transmitted X-rays, and outputting an X-ray detection signal for generating an X-ray transmission image whose observation direction is the direction in which the X-ray is transmitted by converting it into an electrical signal.

The control unit 30 includes a transportation control unit that controls the transportation speed and the transportation interval of the inspection object W by the transportation belt 11 in the transportation unit 10, and an inspection control unit that controls the X-ray irradiation intensity and the irradiation period in the X-ray inspection unit 20, and controls X-ray detection cycle, detection period of each inspection object W and the like in the X-ray line sensor in the X-ray detector 24 corresponding to the transportation speed of the inspection object W, but detailed illustration is omitted.

Further, the control unit 30 has: an X-ray image storage unit 31 that takes in an X-ray detection signal per a predetermined period in the inspection period of each inspection object W from the X-ray detector 24; an image processing unit 32 that takes in an X-ray image generated based on the image data taken in by the X-ray image storage unit 31 as an inspection image and performs image processing such as a predetermined filter processing and the like; a determination unit 33 that performs a predetermined determination processing, for example, determination processing of presence/absence of a foreign matter based on the image data after processing by the image processing unit 32; and a display 34 capable of display outputting the determination result in the determination unit 33.

The X-ray image storage unit 31 is an image input unit, and for example, X-ray detection signals for a plurality of transmission regions from a plurality of detection elements of the X-ray detector 24 are A/D converted, respectively, in the X-ray detector 24. And the X-ray image storage unit 31 performs an action (hereinafter referred to as line scanning) to write the data of cumulative transmission amount in a unit time, as a digital data of the density level representing the gradation from 0 to 1023, for all n detection element regions (n is an integer larger than 1, for example 640) for each predetermined unit transfer time corresponding to the detection element size.

Further, the X-ray image storage unit 31 has a data processing program and a work memory (not shown) that exert a function of outputting to the image processing unit 32 to sequentially generate transmission density data written in the memory as X-ray image data D1, when the line scanning is repeated a predetermined number of times according to the inspection period of each inspection object W.

The image processing unit 32 and the determination unit 33 are configured to include a microcomputer having a CPU, a ROM, a RAM, and an I/O interface (not shown), an auxiliary storage device that readably stores a control program for exerting each function of a plurality of processing units, which will be described later, in cooperation with a ROM, and a timer circuit, so that the CPU executes a predetermined arithmetic process, while exchanging data with and from the RAM or the like, and also executes the control program, according to the control programs stored in the ROM and the like.

The image processing unit 32 has a filter processing unit 32a that performs predetermined filter processing, length calculation processing, and the like on the X-ray image for each inspection object W taken in from the X-ray image storage unit 31. The filter processing unit 32a is a feature extraction filter that enhances the contour (edge) of a foreign matter on the X-ray image for each inspection object W, for example, a differential filter such as a Sobel filter, and the edge of the foreign matter is emphasized by performing differential processing based on a predetermined arithmetic expression in the vicinity of the pixel of interest.

The image processing unit 32 further has a foreign matter detection program that detects foreign matter contained in the inspection object W, and this foreign matter detection program is capable of executing the above-mentioned feature extraction filter processing by the filter processing unit 32a, as multiple X-ray images with different observation directions, regarding the first inspection image Pe corresponding to the original X-ray image data D1 and the second inspection images Ps1 and Ps2 corresponding to the data D2 of the pseudo inspection image described later.

The determination unit 33 is designed to determine whether or not a foreign matter or a defective shape (including a local characteristic shape) satisfying the determination condition is included in inspection object W, by detecting characteristic shape and foreign matter detected in the inspection object W from a plurality of inspection images with differing observation directions from the image processing unit 32, calculating the feature amount such as the area, contour length and sum of concentrations of the detected object, and comparing such feature amount with a given determination reference value.

As shown in FIGS. 1 and 3, the control unit 30 further has: a pseudo three-dimensional information generation model 41, which is a generation model that obtains pseudo three-dimensional information for making it possible to generate second inspection images Ps1 and Ps2 having different observation directions from the first inspection image Pe, by performing 3D recognition based on known shapes and the like, regarding the type of the inspection object W, the articles that were the type of objects to be learned, based on X-ray images (perspective images) in multiple observation directions taken in advance by X-rays, or by performing deep learning in the forward propagation direction using multiple X-ray images with different observation directions for the same observation area as teacher images; an inspection image generation unit 42 that performs a predetermined rendering process based on the pseudo three-dimensional information supplied from the pseudo three-dimensional information generation model 41 with respect to the first inspection image Pe of a two dimensional predetermined image size from the X-ray image storage unit 31, and creates a plurality of pseudo inspection images having different observation directions as the second inspection images Ps1 and Ps2; and a setting device 43 (designating unit) capable of inputting the setting of the type of object to be learned and designating the observation direction (different observation direction) of the second inspection images Ps1 and Ps2.

The article of the type of object to be learned mentioned here refers to a sample article (Ws: not shown) having a similar shape and packaging form to the inspection object W. Further, the articles of the type of object to be learned may be a plurality of sample articles (Ws1, Ws2, . . . ) that reproduce the expected fluctuations in the shape and packaging form of the contents may be used. Such sample articles (Ws) are preferably of the same type and packaging form (quantity of contents, and the like) as the inspection object W, but are not necessarily the same as the inspection object to be actually inspected. It should be noted that even if the materials, shapes, and packaging forms are similar, it is possible to generate a model with no practical problem.

The pseudo three-dimensional information generation model 41 is configured to include a learning device (not shown) capable of obtaining information on the shape of a three-dimensional model of an article (Ws) of type of object to be learned, using the principle of triangulation based on a plurality of two dimensional images having different feature amount, using the image data of a plurality of multi-tone density X-ray images obtained in advance for the articles (Ws) of each type of object to be learned in different observation directions (for example, evenly distributed in all directions), learning the difference in the feature amount such as observation direction between these images and the accompanying shape change and image density distribution (for example, luminance gradient) of each element in the local and wider two dimensional projected image of the inspection object W, furthermore, after grasping known unevenness and texture information, and the like.

This pseudo three-dimensional information generation model 41 preferably obtains information on the shape of the three-dimensional model for the type of object to be learned, by using image data of an X-ray image having a multi-tone density in an omnidirectional multi-observation direction in a predetermined angle. Further, the plurality of observation directions referred to here may include the observation direction of the first inspection image related to the type of object to be learned and at least one different observation direction in which the line-of-sight position is moved so that the line of sight tilts (crosses) with respect to the same observation direction. Further, the plurality of observation directions may include a direction orthogonal to the observation direction of the first inspection image and another observation direction in which the line-of-sight position is moved so as to rotate the orthogonal direction around the main observation direction. At this time, even if there are restrictions on the transportation form of the inspection object W, which has a shape that easily collapses, such as a liquid in a bottle, an image of an X-ray image in another observation direction can be easily obtained by using a case in which the holding posture can be changed.

Further, when the input data of the first inspection image from the X-ray image storage unit 31 is the type of object to be learned, the pseudo three-dimensional information generation model 41 can output the information of the three-dimensional shape and the like learned about the inspection object W of the type of object to be learned, as a pseudo three-dimensional information, to the inspection image generation unit 42. And, the inspection image generation unit 42 creates data of a second inspection image having a different observation direction from the input data of the first inspection image, using the pseudo three-dimensional information.

To be specific, the pseudo three-dimensional information generation model 41 sets a small area that can be filtered (feature extraction) in each X-ray image, for example, for each observation direction that can be specified for the inspection object W of the type of object to be learned, for multiple pre-labeled X-ray images of the inspection object W of the same type to be learned, creates a layer image of one convolutional layer in which the information in the filter is convoluted, by repeating a convolution processing to extract local feature amount from the image data of the small area, while sliding small areas sequentially in the X-ray image, performs a feature extraction to create a layer image of one pooling layer that is further compressed and a feature extraction of combinations from random weighted combinations of nodes (values of the feature amount above) between adjacent layer images by changing the filter, movement range, and the like to execute in multiple layers, to be configured to include a multi-layer (n layers) neural network capable of automatically extracting the feature amount changes that are difficult to extract unless they are region-based, regardless of the position shift or rotation of the inspection object W in the target image.

Further, the pseudo three-dimensional information generation model 41 preliminarily detects the feature points of the images to be learned of a large number of first inspection images and second inspection images, which are sampled by X-ray imaging for each predetermined type of the inspection object W, and then compares the feature amount of each layer of the neural network or the relationship of the feature amount between adjacent or nearby nodes between a plurality of observation directions, grasps the difference in the feature amount corresponding to the difference in the crossing angle and crossing direction between the irradiation direction and the observation direction of the X-rays applied to the inspection object W, for example, the changes in the characteristic shape of a local and wider area of a two dimensional projected image, its length and radius, luminance gradient, transmission amount, and the like, thereby can identify arithmetic expressions such as feature amount weighting coefficients and activation functions in a combination of connections of specific nodes between layers of a multi-layer neural network, and can output as the above-mentioned pseudo three-dimensional information for creating a pseudo inspection image of the X-ray image obtained when changing to a second inspection image in an arbitrary different observation direction different from the observation direction of the first inspection image.

The inspection image generation unit 42 has a neural network for image generation corresponding to a multi-layered neural network in the pseudo three-dimensional information generation model 41, for example, a convolutional neural network using parameters and weighting coefficients of local features of each learned layer, and is capable of generating data D2 of a second inspection image, which is a pseudo inspection image in an observation direction preliminarily designated as an observation direction different from the main observation direction, based on the input image and the above-mentioned pseudo three-dimensional information from the pseudo three-dimensional information generation model 41, when the data of the first inspection image in the main observation direction corresponding to the X-ray transmission direction is inputted from the X-ray image storage unit 31. It should be noted that in FIG. 1, the data D2 of the second inspection image includes the pseudo inspection image Ps1 in the A direction and the pseudo inspection image Ps2 in the B direction which are substantially parallel to each other and orthogonal to each other with respect to the transport surface orthogonal to the main observation direction, but the observation direction and the number of the second inspection images are arbitrary, and it can be set and changed by the setting device 43 which is a designating unit for the observation direction.

Further, the inspection image generation unit 42 calculates the error of the local feature amount between the neural network output for the input and the teacher image of the corresponding second inspection image, when the teacher image of the first inspection image is inputted, and performs the parameter learning by the so-called back propagation method, so as to minimize the error, and the data D2 outputted from the inspection image generation unit 42 when the teacher image of the first inspection image is inputted can improve the degree of imitation of the teacher image of the second inspection image to a required similarity level.

The control unit 30 is configured to be able to obtain accurate observation images of foreign matter and defective shapes, by learning the difference in the local feature amount in the inspection images in those multiple observation directions with respect to the inspection object W by the pseudo three-dimensional information generation model 41 of the multi-layer neural network configuration, based on the X-ray image data (for example, data of n rows and k columns) of the first inspection image and the second inspection image whose observation directions are different from each other in this way, and creating data D2 of the second inspection image of other observation direction based on the data D1 of the first inspection image from the X-ray image storage unit 31, by the inspection image generation unit 42 that uses the learning result.

Each of the second inspection images generated by this inspection image generation unit 42 is taken into the image processing unit 32 in the same manner as the first inspection image from the X-ray image storage unit 32, and the above-mentioned filter processing unit 32a performs image processing or the like for emphasizing the edges of foreign matter or the like contained in the inspection object W, and outputs the image to the determination unit 33. Then, the determination unit 33 determines whether or not the foreign matter is contained in the inspection object W, by calculating the three types of feature amount, which are the area, contour length, and sum of concentrations of the object, for example, from a binary image of the object contained inside the inspection object W and comparing such feature amount with a given determination reference value.

Thus, in the present embodiment, data D2 of the second inspection image having an observation direction which is different from the observation direction of the first inspection image is created each time the inspection object W passes through a predetermined inspection section, based on the data D1 of the first inspection image in the main observation direction stored in the X-ray image storage unit 31, and at the same time, the second inspection image is created as a pseudo inspection image Ps1 in the A direction and a pseudo inspection image Ps2 in the B direction in which the observation directions are different from each other. By this configuration, even in the case that the transportation shape changes so that the inspection objects W partially overlap, and the image density of the overlapped portion in the main observation direction increases according to the X-ray transmission thickness of the overlapped portion, so that it comes difficult to distinguish the overlapping portion from foreign matter and the like, it is possible to accurately observe the foreign matter and the like and their positional relationship, by using a preferable second inspection image in any of the observation directions, for example, a pseudo inspection image Ps1 in the A direction.

It should be noted that the first inspection image is treated here as a true transmission image that identifies the main observation direction, and the determination by the determination unit 33 is performed based on the second inspection image among the first and second inspection images having different observation directions, but it is of course possible to use the first inspection image for the determination together with the second inspection image if necessary. This means that the determination by the determination unit 33 can be performed based on at least the second inspection image among the first and second inspection images.

Next, the operation of this embodiment will be described.

FIG. 2 shows a schematic processing procedure in the X-ray inspection method of one embodiment executed by the X-ray inspection apparatus 1 of the present embodiment.

As shown in FIGS. 2 and 3, first, the inspection object W (for example, a plurality of sausages in FIG. 3) is transported by the transportation unit 10 at a predetermined speed and at a transportation interval, and passes through a predetermined inspection section. Next, when the entry of the inspection object W into the inspection section is detected by an article detection sensor not shown, the X-ray generator 21 of the X-ray inspection unit 20 generates an X-ray that can pass through the inspection object W (X-ray generation step). This X-ray is irradiated to the inspection object W, and the transmitted X-ray is detected for each predetermined transmission region by the line scanning of the X-ray detector 24 (X-ray detection step), and then, the X-ray detection signal corresponding to the amount of X-ray transmission is outputted from the X-ray detector 24 and is sequentially taken into the X-ray image storage unit 31 (X-ray image storage step).

Then, while the line scanning of the X-ray detector 24 is repeated a predetermined number of scans, the data of the original image (hereinafter referred to as the original image), whose transmission amount sequentially written in the X-ray image storage unit 31 is used as the density value of each pixel, is obtained (step S11), and is outputted to the image processing unit 32 as the data D1 of the first inspection image, and is also outputted to the inspection image generation unit 42.

Next, by the inspection image generation unit 42, data D2 of the second inspection image, which is a pseudo inspection image having a different observation direction, is generated, based on the first inspection image which is an input image from the X-ray image storage unit 31 and the above-mentioned pseudo three-dimensional information from the pseudo three-dimensional information generation model 41 (step S12; inspection image generation step).

Next, by the image processing unit 32, the image data D3 for determination to which processing such as edge enhancement of foreign matter and contour is performed is generated for the inspection images Pe, Ps1 and Ps2 in each observation direction, using the first inspection image Pe in the main observation direction from the X-ray image storage unit 31, the pseudo inspection image Ps1 in the A direction and the pseudo inspection image Ps2 in the B direction, which are the second inspection images from the inspection image generation unit 42, and the determination image data D3 is binarized, for example, and a predetermined feature amount D4 (for example, length) is calculated. Then, the determination unit 33 compares the feature amount D4 with a predetermined determination reference value to perform a pass/fail determination corresponding to the presence or absence of a foreign matter (step S13; determination step).

At this time, for example, if the transportation modes of a plurality of inspection objects W overlap each other and foreign matter C is contained in one of the inspection objects W at the overlapping portion, there is a concern that the mixture of the foreign matter C in the range cannot be determined easily from the observation images, because the absorbed dose of X-rays increases so that the density of the X-ray image becomes darker, when observing the overlapping portion or the length direction, as shown in the first inspection image Pe and the pseudo inspection image Ps2 in the B direction in FIG. 3. However, in the present embodiment, in the pseudo inspection image Ps1 from the A direction, there is no overlapping portion of the inspection object W, so that the foreign matter C contained in one of the inspection objects W can be accurately observed.

Thus, in the present embodiment, when the first inspection image stored in the X-ray image storage unit 31 as the original image corresponding to the X-ray detection signal from the X-ray detector 24 is a preliminarily registered image of the type of object to be learned, the data D2 of the second inspection image having a different observation direction from the inspection image is generated by the inspection image generation unit 42, based on the data D1 of the first inspection image related to the type of object to be learned. And, the determination unit 33 performs predetermined determination processing based on the first inspection image Pe and the second inspection images Ps1 and Ps2 with different observation directions, thereby making the X-ray inspection apparatus according to the present embodiment can have a configuration that allows a simple placement of the X-ray generator 21 and an X-ray detector 24, while being an X-ray inspection apparatus with high foreign matter detection accuracy having a plurality of observation directions. As a result, the present invention can provide an X-ray inspection apparatus capable of accurately observing the inspection object with an X-ray image from the observation line-of-sight direction, which is always preferable for detecting suitable foreign matters and grasping the positional relationship, regardless of changes in posture or shape during transportation of the inspection object W, and capable of preventing false detections and reducing the size at low cost.

Further, in the present embodiment, since the X-ray inspection apparatus has a setting device 43 as a designating unit for designating the observation direction when creating the data D2 of the second inspection image by the pseudo three-dimensional information generation model 41, for example, the setting device 43 may specify in advance an observation direction in which there is little overlap on the image that is empirically predicted or determined from the shape of the type of object to be learned, or a suitable observation direction that is naturally predicted from the transport conditions, and the horizontal orientation of the observation direction and the vertical tilt angle can be adjusted, and the processing time can be shortened and the observation direction can be optimized.

Further, in the present embodiment, since the data D1 of the first inspection image and the data D2 of the second inspection image are respectively two dimensional image and the control unit 30 has an image processing unit 32 (image processing means) that performs a predetermined feature extraction processing in addition to the determination unit 33 with respect to the both images of the data D1, data D2, it is possible that the change in image density according to the amount of X-ray transmittance emphasizes sharp edges and contours of the shape to be detected and it is possible to capture local features of the X-ray transmission images so that the inspection accuracy can be effectively improved, by, for example, by performing a differential processing on the data D1 and D2 of each inspection image.

In addition, in the present embodiment, pseudo three-dimensional information effective for generating the data D2 of the second inspection image can be generated, since the pseudo three-dimensional information generation model 41 is assumed to have learned the three-dimensional shape of the inspection object W from the X-ray image in the omnidirectional multi-observation direction regarding type of object to be learned.

Further, in the present embodiment, since the setting device 43 can specify a plurality of observation directions when creating the second inspection image as the designating unit, the observation image from any multiple directions not constrained by the observation direction of the first inspection image can be used as the second inspection image, inspection that can accurately detect foreign matter and specific shapes is possible, even if, for example, the transported form of the inspection object W is in an overlapping state such that it forms an unexpected shape.

Another observation direction may be selected and specified by the setting device 43 from out of a plurality of candidate observation directions having a predetermined crossing angle (for example, 90 degrees, 45 degrees, and the like) with respect to the main observation direction and having a right-angled interval (for example, 90 degrees, 45 degrees, and the like) with each other, or the predetermined crossing angle and the equiangular interval may be variably set.

In the X-ray inspection method of the present embodiment, when the original image stored as the first inspection image Pe corresponding to the X-ray detection signal is an image of the type of inspection object, the second inspection images Ps1 and Ps2 having different observation directions from the inspection image are created, based on the first inspection image Pe for that type, and the determination processing regarding the quality state of the inspection object is performed based on at least the second inspection images Ps1 and Ps2 of the first inspection images Pe and the second inspection images Ps1 and Ps2 having different observation directions.

Therefore, the X-ray images having the observation direction of any direction that is not constrained by the observation direction of the first inspection image Pe, that is, the direction of the X-ray irradiation with respect to the inspection object can be the second inspection images Ps1 and Ps2, inspection processing that can accurately detect foreign matter and specific shapes is possible, for example, even in an overlapping state where the transportation form forms an unexpected shape or, a state in which the observation direction constrained by the placement state, which is prioritized to stabilize the transport of the inspection object that is prone to fall, causes a blind spot in the X-ray image.

Thus, in the present embodiment, although it has a simple structure, it is possible to provide an X-ray inspection apparatus and an X-ray inspection method capable of accurately observing the inspection target with an X-ray image from a preferable observation line-of-sight direction regardless of changes in the posture or shape of the inspection object W during transportation, of preventing false detection at low cost, and of miniaturizing the X-ray inspection apparatus.

Second Embodiment

Figure 4:
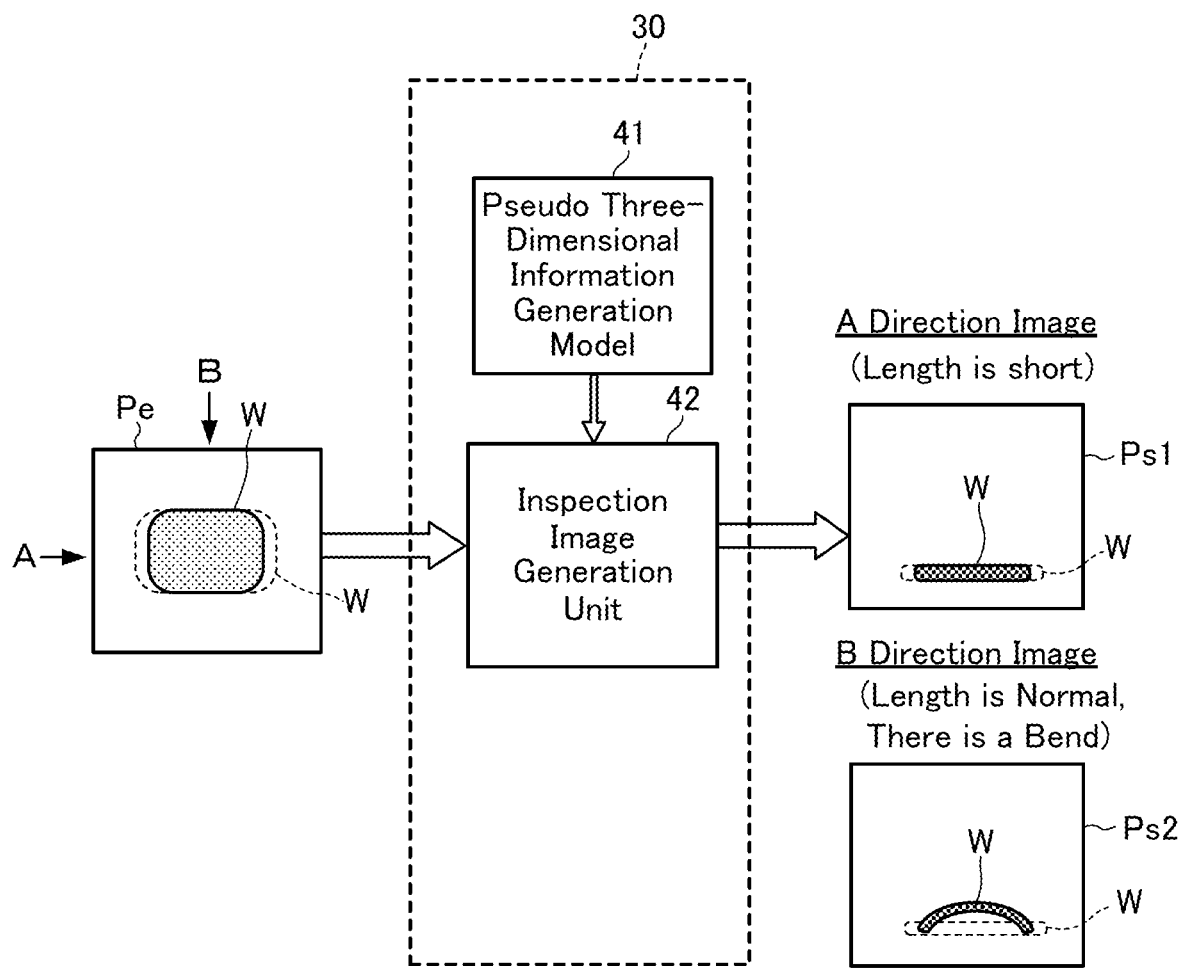
FIG. 4 is an explanatory diagram of a stage in which a plurality of pseudo inspection images having different observation directions are generated from an original image by the X-ray inspection method in the X-ray inspection apparatus according to the second embodiment of the present invention.

FIG. 4 shows the second embodiment for implementing the present invention as an X-ray inspection apparatus capable of detecting defective shapes that deviate from the allowable range of the shape and size of the inspection object W.

The present embodiment is similar to the first embodiment in the basic apparatus configuration shown in FIG. 1, and is different from the first embodiment in the point that its action detects the deformation such as bending of the inspection object W or insufficient length due to bending as a defect by performing an X-ray inspection process that generates multiple pseudo inspection images with different observation directions from the original image. Hereinafter, the same reference numerals as those of the corresponding components shown in FIG. 1 will be used for the same configurations as those of the first embodiment, and the differences from the first embodiment will be mainly described.

As shown in FIG. 4, the control unit 30 is constituted by a pseudo three-dimensional information generation model 41 that obtains the aforementioned pseudo three-dimensional information by deep learning, and an inspection image generation unit 42 that create a plurality of the second inspection images Ps1, Ps2 having different observation directions, with respect to the first inspection image Pe of a predetermined size of the second dimension from the X-ray image storage unit 31, based on the pseudo three-dimensional information from the pseudo three-dimensional information generation model 41.

When the first inspection image Pe from the X-ray image storage unit 31 relates to the type of object to be learned, the A direction and the B direction orthogonal to the main observation direction of the first inspection image Pe set as two separate observation directions, the pseudo three-dimensional information generation model 41 outputs the information such as learned information of three-dimensional shape and the like to the inspection image generation unit 42, about the inspection object W of the type of object to be learned, as the pseudo three-dimensional information.

Then the inspection image generation unit 42 creates the data D2 of the second inspection images Ps1, Ps2 having different observation directions from the inspection image Pe to be inputted and the corresponding pseudo data D1 of the first inspection image Pe, using the first inspection image Pe to be inputted and the corresponding pseudo three-dimensional information.

At this time, for example, if a part of the inspection object W that is easily broken breaks and falls off, and the inspection object W is shortened to the extent that it is out of an allowable range of shape and size, by observing from the main observation direction and the A direction, it is possible to grasp a defective shape with an insufficient length (including the length in the width direction), as shown in the first inspection image Pe and the pseudo inspection images Ps1, Ps2 which are the second inspection images in FIG. 4.

However, as shown in the observation image from the B direction, if the length width of the product is normal due to warping or bending of the inspection object W, but it is observed that the length is insufficient when observed from the main observation direction, even if it is a normal product that meets the required product mass, there is a concern that it may be judged as a defect with insufficient length. Of course, since the inspection objects W overlap each other, there is a concern that it may be determined that the length is excessive when observed from the main observation direction.

In the present embodiment, even if the inspection object W is bent and it is difficult to grasp the bend in the pseudo-inspection image Ps1 in the A direction due to the increase in thickness, it is possible to accurately determine that the product is a normal product and the length is not insufficient, by grasping the contour shape of the side surface of the inspection object W and calculating the contour length from the observation image in the B direction.

Thus, in the present embodiment as well, while the X-ray generator 21 and the X-ray detector 24 are arranged in a simple configuration, the inspection target can be accurately observed with an X-ray image from a preferable observation line-of-sight direction, regardless of the changes in the posture or shape of the inspection object W during transportation, so that the same effect as that of the first embodiment can be obtained.

Third Embodiment

Figure 5:
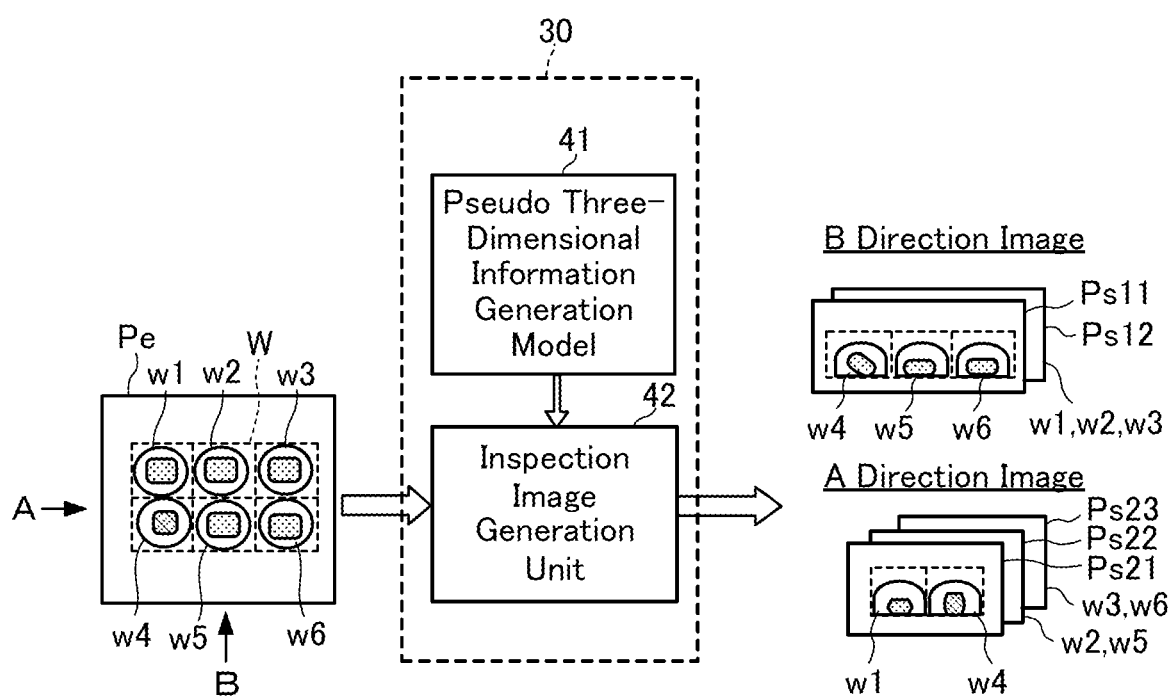
FIG. 5 is an explanatory diagram of a stage in which a plurality of pseudo inspection images having different observation directions from an original image are generated from an original image of the inspection object transmitted through an X-ray by the X-ray inspection method in the X-ray inspection apparatus according to the third embodiment of the present invention.
Figure 6:
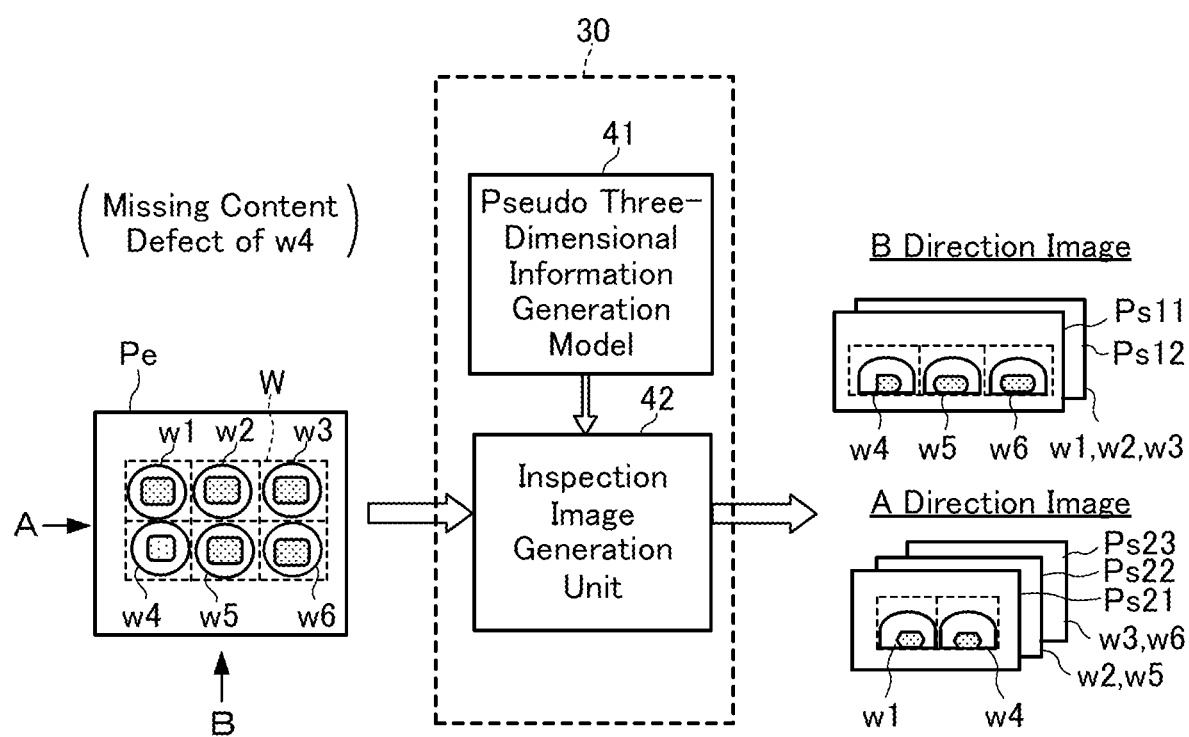
FIG. 6 is an explanatory diagram of a stage in which a plurality of pseudo inspection images having different observation directions from an original image are generated from an original image of the defective inspection object transmitted through an X-ray by the X-ray inspection method in the X-ray inspection apparatus according to the third embodiment of the present invention.

FIG. 5 and FIG. 6 show the third embodiment to implement the present invention as an X-ray detection apparatus capable of detecting that the inspection object W is a defective shape product whose shape or size of the content or hollowness is out of the allowable range.

Similar to the second embodiment, the basic device configuration of the present embodiment is the same as that of the first embodiment shown in FIG. 1, and the operation is different from the first and second embodiments, in the point that he operation detects the defects in the shape and size of the contents of the inspection object W and the hollowness, by performing an X-ray inspection process that generates a plurality of pseudo inspection images having different observation directions from the original image.

As shown in FIGS. 5 and 6, the control unit 30 includes the pseudo three-dimensional information generation model 41 and the inspection image generation unit 42 described above, and the pseudo three-dimensional information generation model 41 outputs information such as the learned three-dimensional shape of the inspection object W of the type of object to be learned as the pseudo three-dimensional information to the inspection image generation unit 42, when the first inspection image Pe from the X-ray image storage unit 31 relates to the type of object to be learned. Then, the inspection image generation unit 42 uses the inputted first inspection image Pe and the corresponding pseudo three-dimensional information, to create the data D2 of the second inspection images Ps1, Ps2 having different observation directions, from the input data D1 of the first inspection image Pe.

Here, in the case that the inspection object W contains a plurality of foods w1 to w6, and each food w1 to w6 is, for example, the contents of a predetermined shape of ingredients, pulp, and the like wrapped in another edible casing material or the like, when the contents of food w4 are in a slanted posture different from the contents of other foods w1 to w3, w5, w6, as shown in FIG. 5, the contents of the food w4 are observed from the observation direction inclined in the length direction in the first inspection image Pe in the main observation direction, and although it looks short, it is a normal product.

In this case, if a pass/fail judgment is made only with the first inspection image Pe in the main observation direction, there is a concern that the content of the food w4 contained in the inspection object W is determined to be insufficient in size.

However, in the present embodiment, the content of the food w4 only looks thicker than the others in the A direction image in FIG. 5, by preparing pseudo inspection images Ps11, Ps12 from the B direction and pseudo-inspection images Ps21, Ps22, Ps23 from the A direction for each observation transmission region including a local feature amount such as the shape of the contents of each food w1 to w6, but, as shown in the B direction image in FIG. 5, since the posture of the contents of the food w4 can be grasped, it is possible to prevent the food w4 from being observed as insufficient in size when observed from the main observation direction even though the contents are normal.

On the other hand, as shown in FIG. 6, when the contents of food w4 is shorter than the content of other foods w1 to w3, w5, w6 and is a defective product with insufficient size, the length of the contents of the food w4 seems to be insufficient in the first inspection image Pe in the main observation direction, but the posture may be tilted, so that it is not possible to grasp accurately. Therefore, if the pass/fail judgment is made only by the first inspection image Pe in the main observation direction, there is a concern that the content of the food w4 contained in the inspection object W is not determined to be insufficient in size.

However, in the present embodiment, the content of the food w4 only looks the same as others in the A direction image in FIG. 6, by preparing pseudo inspection images Ps11, Ps12 from the B direction and pseudo-inspection images Ps21, Ps22, Ps23 from the A direction for each observation transmission region including a local feature amount such as the shape of the contents of each food w1 to w6, but, as shown in the B direction image in FIG. 6, since the fact that the length of the contents of the food w4 is short can be grasped, it is possible to prevent the food w4 from being observed as normal even though the contents are defective.

Thus, in the present embodiment as well, while the X-ray generator 21 and the X-ray detector 24 are arranged in a simple configuration, the inspection target can be accurately observed with an X-ray image from a preferable observation line-of-sight direction, regardless of the changes in the posture or shape of the inspection object W during transportation, so that the same effect as that of the first embodiment can be obtained.

It should be noted that, in the first embodiment described above, it is assumed that the first inspection image Pe is an X-ray image from only the main observation direction in the vertical direction, but it goes without saying that the present invention may use original images from two main observation directions that are tilted in opposite directions with respect to the vertical direction, to perform the X-ray inspection process as in the first to third embodiments, by the plurality of first inspection images and the plurality of second inspection images in the corresponding different observation directions.

Further, the inspection image generation unit 42 for creating a pseudo transparent image according to the present invention uses a learning device or an image generation model having a multi-layered neural network configuration using AI (artificial intelligence), but some products have a fixed form, using the conventional 3D recognition technology from the inclination and shape change of the fixed part depending on the observation direction in the X-ray image information observed in multiple directions, the image density gradient, and the like, so that it may be possible to generate pseudo three-dimensional information.

Further, the inspection image outputted by the inspection image creation unit 42 to the determination unit 33 has been described as the second inspection images Ps1, Ps2 and the like which are pseudo inspection images, but it goes without saying that the data D1, D2 of the first and second inspection images are processed to be images suitable for determination, and then the corresponding images can be outputted to the determination unit 33, and comprehensive determination can be made based on a plurality of determination results.

As described above, the present invention can provide an X-ray inspection apparatus and an X-ray inspection method capable of always accurately observing the inspection object by the X-ray image from a preferable observing direction, in spite of the shape and the change of the posture during transportation, while simply placing the X-ray source and X-ray detector, thereby making it possible to prevent false detection at a low cost and aim for miniaturization. The present invention as described above is useful for all X-ray inspection devices preferrable for detecting foreign matters, detecting missing items, and inspecting the shape and arrangement of the contents of an inspection object by using a plurality of inspection images.

EXPLANATION OF REFERENCE NUMERALS

1 X-Ray Inspection apparatus
10 Transportation Unit
11 Transportation Belt
11*a* Forward Running Section
12, 13 Transportation Roller
20 X-Ray Inspection Unit
21 X-Ray Generator (X-Ray Source)
22 X-Ray Tube
23 Enclosure
23*a* X-Ray Window Portion
24 X-Ray Detector (X-Ray Line Sensor)
30 Control unit
31 X-Ray Image Storage Unit
32 Image Processing Unit
32*a* Filter Processing Unit
33 Determination Unit
34 Display
41 Pseudo Three-Dimensional Information Generation Model (Learning Device, Inspection Image Creation Unit)
42 Inspection Image Generation Unit (Inspection Image Creation Unit, Pseudo Inspection Image Generation Unit)
43 Setting Device (Designating Unit)
D1 First Inspection Image Data (Original X-Ray Image Data)
D2 Second Inspection Image Data (Pseudo Inspection Image Data)
D3 Image Data For Determination
D4 Feature Amount
Pe First Inspection Image (Original X-Ray Image)
Ps1, Ps2 Pseudo Inspection Image (Second Inspection Image, Observation Image)
Ps11, Ps12 Pseudo Inspection Image (Second Inspection Image, Observation Image)
Ps21, Ps22, Ps23 Pseudo Inspection Image (Second Inspection Image, Observation Image)
W inspection object
w1-w6 Food (Contents)

What is claimed is:

1. An X-ray inspection apparatus, comprising:
an X-ray generator that generates an X-ray that transmits through an inspection object to be transported;
an X-ray detector that detects the X-ray that transmitted through the inspection object, and outputs an X-ray detection signal; and
a determination unit that determines a quality state of the inspection object, by a first inspection image generated based on the X-ray detection signal,
an X-ray image storage unit that stores the first inspection image, corresponding to the X-ray detection signal outputted from the X-ray detector, whose observation direction is the direction in which the X-rays transmits through the inspection object;
a pseudo three-dimensional information generation model that generates a pseudo three-dimensional information regarding a type of the inspection object from the first inspection image; and
an inspection image generation unit that creates a second inspection image regarding the inspection object having the observation direction different from the first inspection image based on the first inspection image and the pseudo three-dimensional information, wherein
the determination unit performs the determination, based on at least the second inspection image created by the inspection image generation unit, and
the pseudo three-dimensional information generation model has learned a shade pattern corresponding to the three-dimensional shape of the type of the inspection object, from X-ray images in a plurality of observation directions regarding the type of the inspection object.

2. The X-ray inspection apparatus according to claim 1, further comprising a designating unit that designates the observation direction, when the second inspection image is created by the pseudo three-dimensional information.

3. The X-ray inspection apparatus according to claim 1, wherein
the determination unit has an image processing unit that performs a predetermined feature extraction process based on the first inspection image and the second inspection image.

4. The X-ray inspection apparatus according to claim 2, wherein
the designating unit can designate a plurality of the observation directions when creating the second inspection image.

5. The X-ray inspection apparatus according to claim 2, wherein
the determination unit has an image processing unit that performs a predetermined feature extraction process based on the first inspection image and the second inspection image.

6. An X-ray inspection method, comprising:
an X-ray generation step of generating an X-ray that transmits through an inspection object to be transported;
an X-ray detection step of detecting the X-ray that transmitted through the inspection object to output an X-ray detection signal;
a determination step of determining a quality state of the inspection object, by a first inspection image generated based on the X-ray detection signal,
an X-ray image storage step of storing the first inspection image corresponding to the X-ray detection signal outputted in the X-ray detection step and having a direction in which the X-ray transmits through the inspection object as an observation direction;
a pseudo three-dimensional information generation model generation step of generating a pseudo three-dimensional information about the type of inspection object from the first inspection image; and
an inspection image generation step of creating a second inspection image regarding the inspection object having the observation direction different from the first inspection image based on the pseudo three-dimensional information generation model and the first inspection image, wherein the determination step performs the determination, based on at least the second inspection image created by the inspection image generation step, and the pseudo three-dimensional information generation model generation step performs learning of the pseudo three-dimensional information generation model for a shade pattern corresponding to the three-dimensional shape of the type of the inspection object learned from X-ray images in a plurality of observation directions regarding the type of the inspection object.

7. The X-ray inspection method according to claim 6, further comprising:

a designating step of designating the observation direction different from the first inspection image when creating the second inspection image.

8. The X-ray inspection method according to claim 6, wherein the determination step includes image processing for performing a predetermined feature extraction process based on the first inspection image and the second inspection image.

9. The X-ray inspection method according to claim 7, wherein the designating step includes designating a plurality of the observation directions when creating the second inspection image.

10. The X-ray inspection method according to claim 7, wherein the determination step includes image processing for performing a predetermined feature extraction process based on the first inspection image and the second inspection image.

* * * * *